O. B. WATTLES.
Straw Cutter.
No. 32,096. Patented April 16, 1861.
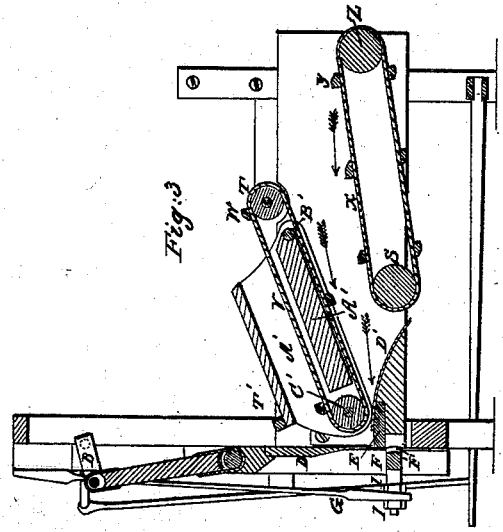
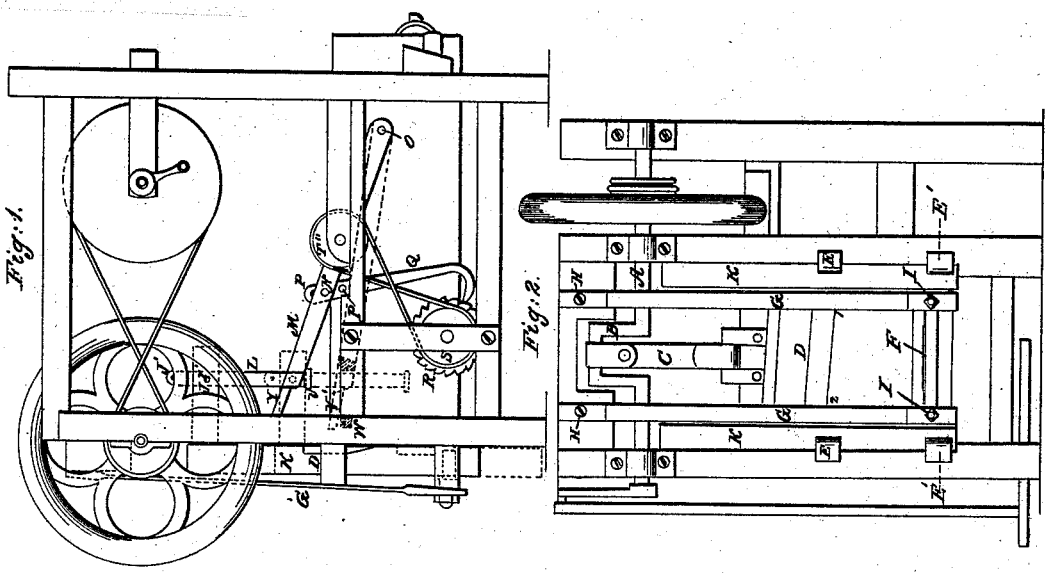
Witnesses:
Inventor:
Otis B. Wattles

UNITED STATES PATENT OFFICE.

OTIS B. WATTLES, OF MOORESBORO, NORTH CAROLINA.

STRAW-CUTTER.

Specification of Letters Patent No. 32,096, dated April 16, 1861.

*To all whom it may concern:*

Be it known that I, OTIS B. WATTLES, of Mooresboro, in the county of Cleveland and State of North Carolina, have invented a new and useful Improvement in Straw-Cutters; and I do hereby declare that the following is a full, clear, and exact description of the same, reference being had to the accompanying drawings, forming a part of this specification, in which—

Figure 1, represents a side view, Fig. 2, a front view, and Fig. 3, a vertical longitudinal section of the straw cutter.

Similar letters of reference in each of the several figures indicate corresponding parts.

The nature of my invention consists, 1st, in the relative arrangement of a feed apron and rollers with fixed bearings and a pressure apron with one of its two rollers on hinged bearings, in combination with a reciprocating knife, substantially as and for the purpose hereinafter described.

It consists, 2nd, in the combination of a hook and intermittent feed lever, with a pawl and ratchet wheel, for the purpose hereinafter described.

It consists, 3rd, in the sharpening device consisting of a sharpening steel, springs and adjusting screw nuts in combination with an oblique reciprocating knife, substantially as hereinafter described.

It consists, 4th, in the relative arrangement of feed apron, hinged pressure apron, intermittent feed device and adjustable spring sharpening device in combination with an oblique and reciprocating knife, all as and for the purposes hereinafter described.

To enable others, skilled in the art, to make and use my invention, I will proceed to describe its construction and operation.

The knife D, of this straw cutter is arranged somewhat obliquely, as seen in Fig. 2, so as to gradually cut the straw, corn husks, &c. fed to it during its descent. The knife is held in a frame K, vertically reciprocating in vertical guide ways E'. The reciprocating motion is imparted by means of a crankshaft A, B, and pitman C, the usual construction. The inside of the knife is one vertical plane, while its outside is beveled, as seen in Fig. 3, so as to produce a sharp cutting edge. As the knife descends, the inside of it just touches and moves across the outer edge of the mouth E, of the feed box, so as to cut the straw nicely. As the part $i$, of the knife edge passes the mouth E, during the descent of the knife, it enters the space formed by the rounded corner F', of the sharpening steel F, which latter is attached to the lower ends of two long springs G, G, by means of adjusting screw-nuts I, I, the upper ends of said springs being secured to the frame of the machine at H, H. As the knife further descends, its beveled outer surface comes in contact with and pushes the sharpening steel F, outward, thus overcoming the tendency of the springs G, G, which press the sharpening steel inward. This action of the steel piece F, against the beveled knife edge, serves to keep the knife sharp, no matter how long it may be kept in use. An inclined metal guard D', is arranged in rear of the mouth E, of the feed-box and serves to guide the straw, corn shucks, &c. to the mouth E, as fed along by the aprons now to be described.

The endless feed apron X, is arranged immediately in rear of the mouth E, and guard D', on rollers S, Z, which have their bearings in the frame of the machine. Another endless apron V, moves on rollers T, C', the first of which has its bearings in the frame of the machine, while the roller C', has its bearings in a pressure frame A', hinged to the main frame at B'. The weight of this frame A',— which can be increased by placing weights on the top board T'—will bear down on the straw, corn shucks, &c., fed through the machine so as to compress it immediately in rear of the knife whereby the action of the knife will be considerably facilitated and the cutting process be made perfectly regular.

Both aprons are provided with cross ribs W, Y, respectively which are intended to prevent the straw, corn shucks &c., from slipping between the aprons. The aprons receive an intermediate revolving motion in the direction of the arrows seen in Fig. 3, in the following manner.

A pulley T'', is secured to the outer end of the roller T, and a similar pulley S', to the outer end of roller S, both pulleys being connected by a cross band. A ratchet wheel R, is secured to the pulley S', and is operated by a pawl Q. The pawl Q, is hung—at N— to a lever M, pivoted to the main frame at O. The forward end V', of lever M, is slotted and a rod L, hookshaped at its lower end U, extends through said slot. The upper end of the rod L, is attached to an arm J, extending backward from the knife frame K. As the rod L, together with the knife frame descends the slotted end V', of the lever M, rests on the hook U, and the lever and the pawl Q, descend together with the hook until the forward end V', of the lever comes to rest in the recess W', in the main frame of the machine. The bar L, moves then through the slot V', and the hook continues its descent until the knife frame has arrived in its lowest position and commences its return motion—see the position represented by red lines in Fig. 1. As soon as the knife during its ascent has cleared the mouth of the feed box, the hook ascending together with the knife frame, strikes the under surface of the knife V', of the lever M, and lifts this end of the lever into the original position represented in Fig. 1 by black lines. The lever M, as it ascends, raises the pawl Q, and thereby turns the ratchet wheel R, and imparts the necessary feed motion to the aprons by means of band and pulleys S', T''. It will be seen that in this manner the feed motion is made to be intermittent, and to adapt itself to the respective positions of the knife.

By means of the pin I', and holes J', in the upper end of the rod L, the rod can be shortened or lengthened so as to cause the hook to act on the lever and pawl during a longer or shorter time and thereby increase or decrease the length of feed during each stroke of the knife. The pin N, and holes P, in the upper end of pawl Q, serve to adjust the pawl according to the adjustment of the rod L, and hook.

The advantages of this machine are that it works equally well for straw and coarse stuff, such as corn husks, &c., and that its construction is very simple and almost every part of it can be made of wood and can therefore be made and also repaired whenever necessary anywhere in the country, without the aid of a skilled machinist.

What I claim as my invention and desire to secure by Letters Patent, is—

1. The relative arrangement of a feed apron X, and rollers S, Z, with fixed bearings, and a pressure apron V, with one C', of its two rollers on hinged bearings A', in combination with a reciprocating knife D, substantially as and for the purposes set forth.

2. The combination of the hook V, constructed and arranged as described, with the intermittent lever M, pawl Q and ratchet wheel R, for the purpose described.

3. The sharpening device consisting of a sharpening steel F, springs G, G, and adjusting screw nuts I, I, I, I, in combination with an oblique reciprocating knife D, substantially as and for the purposes set forth.

4. The relative arrangement of feed apron X, hinged pressure apron V, intermittent feed device L, U, M, Q, R, and adjustable spring sharpening device G, I, E, in combination with an oblique and reciprocating knife D, all substantially as and for the purposes set forth.

OTIS B. WATTLES.

Witnesses:
 GOODWIN Y. AT LEE,
 ROBT. W. FENWICK.